US010815437B2

(12) United States Patent
Mukherjee

(10) Patent No.: US 10,815,437 B2
(45) Date of Patent: Oct. 27, 2020

(54) CONVERSION OF HEAVY FUEL OIL TO CHEMICALS

(71) Applicant: LUMMUS TECHNOLOGY LLC, Bloomfield, NJ (US)

(72) Inventor: Ujjal K. Mukherjee, Montclair, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 0 days.

(21) Appl. No.: 16/235,824

(22) Filed: Dec. 28, 2018

(65) Prior Publication Data

US 2019/0203130 A1    Jul. 4, 2019

Related U.S. Application Data

(60) Provisional application No. 62/612,080, filed on Dec. 29, 2017.

(51) Int. Cl.
| | |
|---|---|
| *C10G 69/10* | (2006.01) |
| *C10G 69/14* | (2006.01) |
| *B01J 19/00* | (2006.01) |

(52) U.S. Cl.
CPC .......... *C10G 69/10* (2013.01); *B01J 19/0046* (2013.01); *C10G 69/14* (2013.01);
(Continued)

(58) Field of Classification Search
CPC .. C10G 69/10; C10G 69/14; C10G 2300/202; C10G 2300/1044; C10G 2400/20; C10G 2400/30; B01J 19/0046
See application file for complete search history.

(56) References Cited

U.S. PATENT DOCUMENTS

| | | |
|---|---|---|
| 2013/0149767 A1 | 6/2013 | Marion et al. |
| 2013/0240406 A1* | 9/2013 | Sadler .................... C10G 65/10 208/59 |

(Continued)

FOREIGN PATENT DOCUMENTS

WO    2015128041 A1    9/2015

OTHER PUBLICATIONS

International Search Report issued in Corresponding International Application No. PCT/US2018/067965, dated Apr. 22, 2019 (4 pages).

(Continued)

*Primary Examiner* — Brian A McCaig
(74) *Attorney, Agent, or Firm* — Osha Liang LLP

(57) ABSTRACT

Processes and systems for converting high sulfur fuel oils to petrochemicals including hydrocracking the high sulfur fuel oil in a fuel oil hydrocracker to form a cracked fuel oil effluent, which may be separated into a light fraction and a heavy fraction. The heavy fraction may be gasified to produce a syngas, and the syngas or hydrogen recovered from the syngas may be fed to the fuel oil hydrocracker. The light fraction may be hydrocracked in a distillate hydrocracker to form a cracked effluent, which may be separated into a hydrogen fraction, a light hydrocarbon fraction, a light naphtha fraction, and a heavy naphtha fraction. The heavy naphtha fraction may be reformed to produce hydrogen and at least one of benzene, toluene, and xylenes. The light hydrocarbon fraction and/or the light naphtha fraction may be steam cracked to produce at least one of ethylene, propylene, benzene, toluene, and xylenes.

30 Claims, 5 Drawing Sheets

(52) U.S. Cl.
CPC ............... *B01J 2219/00006* (2013.01); *C10G 2300/1044* (2013.01); *C10G 2300/202* (2013.01); *C10G 2400/20* (2013.01); *C10G 2400/30* (2013.01)

(56) References Cited

U.S. PATENT DOCUMENTS

| | | |
|---|---|---|
| 2016/0137933 A1 | 5/2016 | Ward et al. |
| 2016/0369186 A1 | 12/2016 | Dittrich et al. |
| 2016/0369188 A1 | 12/2016 | Housmans et al. |

OTHER PUBLICATIONS

Written Opinion issued in Application No. PCT/US2018/067965, dated Apr. 22, 2019 (5 pages).

* cited by examiner

CONVERSION OF HEAVY FUEL OIL TO CHEMICALS

BACKGROUND

To date, most crude has been partially converted to chemicals in large refinery-petrochemicals complexes. The focus of the refinery is to produce transportation fuels such as gasoline and diesel. Low value streams from the refinery, such as LPG and light naphtha, are routed to petrochemicals complexes that may or may not be adjacent to the refinery. The petrochemicals complex then produces chemicals such benzene, paraxylene, ethylene, propylene and butadiene. A typical complex of this kind is shown in FIG. 1, where the units and streams have the following reference numbers.

| | |
|---|---|
| Refinery | 10 |
| Crude Oil Feed | 14 |
| Crude and Vacuum Distillation | 16 |
| Catalytic Reformer | 18 |
| Hydrotreater | 20 |
| Diesel from Hydrotreater | 22 |
| Hydrocracker | 24 |
| Diesel from Hydrocracker | 26 |
| Fluid Catalytic Cracking (FCC) | 28 |
| FCC Propylene | 30 |
| FCC Gasoline | 32 |
| Residue Conversion Unit | 34 |
| Fuel Oil | 36 |
| Chemicals Complex | 40 |
| Aromatics Complex | 42 |
| Benzene | 44 |
| Paraxylene | 46 |
| Steam Cracker | 48 |
| Steam Cracker Ethylene | 50 |
| Steam Cracker Propylene | 52 |
| Steam Cracker Butadiene | 54 |

Fuel oil that may be produced from the residue conversion unit in the refinery often contains a high sulfur content. The International Maritime Organization (IMO) is currently considering regulations to cut sulfur emissions from ships. Specifically, it is expected the new requirements reset sulfur emissions from the current maximum of 3.5 wt % of fuel content to 0.5 wt %.

Typically, refiners have been selling vacuum residue from their refineries as high sulfur fuel oil, blending to form a low sulfur fuel oil, or converting the vacuum residue to vacuum gas oil or lighter distillates using residue hydrocracking or Delayed Coking or, in some instances, desulfurizing the vacuum residue to an oil suitable for feeding Residue FCC units. The vacuum residue may alternatively be sent to a residue hydrocracking unit to convert the vacuum residue to vacuum gas oil and other light fractions, which may be sent for further upgrading in distillate hydrotreating or hydrocracking units. Or, the vacuum residue may be sent to a sulfur deasphalting unit for recovering a deasphalted oil fraction and the pitch fraction may either be blended to a high or low sulfur fuel oil or where possible, used as road asphalt.

Each of these applications involves production of transportation fuels and is associated with a refinery. In each of these instances, the high sulfur fuel oil will become a very low value product. Further, the aforementioned IMO regulations may eliminate the route to sell high sulfur fuel oil in the near future.

SUMMARY OF THE DISCLOSURE

Embodiments herein relate to a process that directly converts high sulfur fuel oil to petrochemicals, producing a higher value end product. The IMO regulations will create a surplus of off-spec and very low value high sulfur fuel oil as a feedstock. Embodiments herein convert the low value fuel oil to petrochemicals, rather than transportation fuels. Embodiments herein may also remain in hydrogen balance.

In one aspect, embodiments disclosed herein relate to a process for converting high sulfur fuel oils to petrochemicals. The process may include hydrocracking a high sulfur fuel oil in an ebullated bed or slurry bed fuel oil hydrocracker to form a cracked fuel oil effluent. The cracked fuel oil effluent may be separated into a light fraction and a heavy fraction. The light fraction may be hydrocracked in a distillate hydrocracker to form a cracked effluent, which may be separated into a hydrogen fraction, a light hydrocarbon fraction, a light naphtha fraction, and a heavy naphtha fraction. The heavy naphtha fraction may be reformed to produce a reformer effluent comprising hydrogen and at least one of benzene, toluene, and xylenes. The light hydrocarbon fraction and/or the light naphtha fraction may be steam cracked in a steam cracker to produce a steam cracker effluent comprising at least one of ethylene, propylene, benzene, toluene, and xylenes.

In some embodiments, the heavy fraction may be gasified to produce a syngas comprising carbon monoxide and hydrogen. The syngas or hydrogen recovered from the syngas may be fed to the fuel oil hydrocracker. In other embodiments, the heavy fraction (unconverted oil) may be fed to a delayed coking unit, a cement plant, or, where it is an IMO compliant ultralow sulfur fuel oil, may either be used internally or sold as high value product.

In another aspect, embodiments disclosed herein relate to a system for converting high sulfur fuel oils to petrochemicals. The system may include an ebullated bed or slurry bed fuel oil hydrocracker for hydrocracking a high sulfur fuel oil to form a cracked fuel oil effluent. A first separation system may be provided for separating the cracked fuel oil effluent into a light fraction and a heavy fraction. The system may also include a gasifier for gasifying the heavy fraction to produce a syngas comprising carbon monoxide and hydrogen. A flow line may be provided for feeding the syngas or hydrogen recovered from the syngas to the fuel oil hydrocracker. The system may further include a distillate hydrocracker, a catalytic reformer, and a steam cracker. The distillate hydrocracker may hydrocrack the light fraction to form a cracked effluent, and a second separation system may separate the cracked effluent into a hydrogen fraction, a light hydrocarbon fraction, a light naphtha fraction, and a heavy naphtha fraction. The catalytic reformer may reform the heavy naphtha fraction to produce a reformer effluent comprising hydrogen and at least one of benzene, toluene, and xylenes. The steam cracker may crack the light hydrocarbon fraction and/or the light naphtha fraction to produce a steam cracker effluent comprising at least one of ethylene, propylene, benzene, toluene, and xylenes.

In another aspect, embodiments disclosed herein relate to a process for converting high sulfur fuel oils to petrochemicals. The process may include hydrocracking a high sulfur fuel oil in an ebullated bed or slurry bed fuel oil hydrocracker to form a cracked fuel oil effluent. The cracked fuel oil effluent may then be separated into a light fraction and a heavy fraction. The process may also include hydrocracking the light fraction in a distillate hydrocracker to form a cracked effluent, and separating the cracked effluent to recover one or more gas fractions, such as hydrogen, hydrogen sulfide, and/or ammonia, and to recover two or more hydrocarbon fractions, including a light hydrocarbon fraction and a heavy hydrocarbon fraction. The heavy hydrocarbon fraction may then be hydrocracked to produce a hydrocracked effluent comprising naphtha range and lighter hydrocarbons. The light hydrocarbon fraction and the hydrocracked effluent may be fed to an ethylene complex to produce petrochemicals including ethylene, propylene, butadiene, benzene, toluene, xylenes, and/or methyl tertiary-butyl ether.

In another aspect, embodiments disclosed herein relate to a system for converting high sulfur fuel oils to petrochemicals. The system may include an ebullated bed or slurry bed fuel oil hydrocracker for hydrocracking a high sulfur fuel oil in to form a cracked fuel oil effluent. The system may also include a separator for separating the cracked fuel oil effluent into a light fraction and a heavy fraction. A distillate hydrocracker may be provided for hydrocracking the light fraction in to form a cracked effluent. A separation system may be provided for separating the cracked effluent to recover one or more gas fractions comprising hydrogen, hydrogen sulfide, and/or ammonia, and to recover two or more hydrocarbon fractions, including a light hydrocarbon fraction and a heavy hydrocarbon fraction. The system may also include a hydrocracker for hydrocracking the heavy hydrocarbon fraction to produce a hydrocracked effluent comprising naphtha range and lighter hydrocarbons. An ethylene complex may be provided converting the light hydrocarbon fraction and the hydrocracked effluent to produce petrochemicals including ethylene, propylene, butadiene, benzene, toluene, xylenes, and/or methyl tertiary-butyl ether.

Other aspects and advantages will be apparent from the following description and the appended claims.

DETAILED DESCRIPTION

Figure 1:
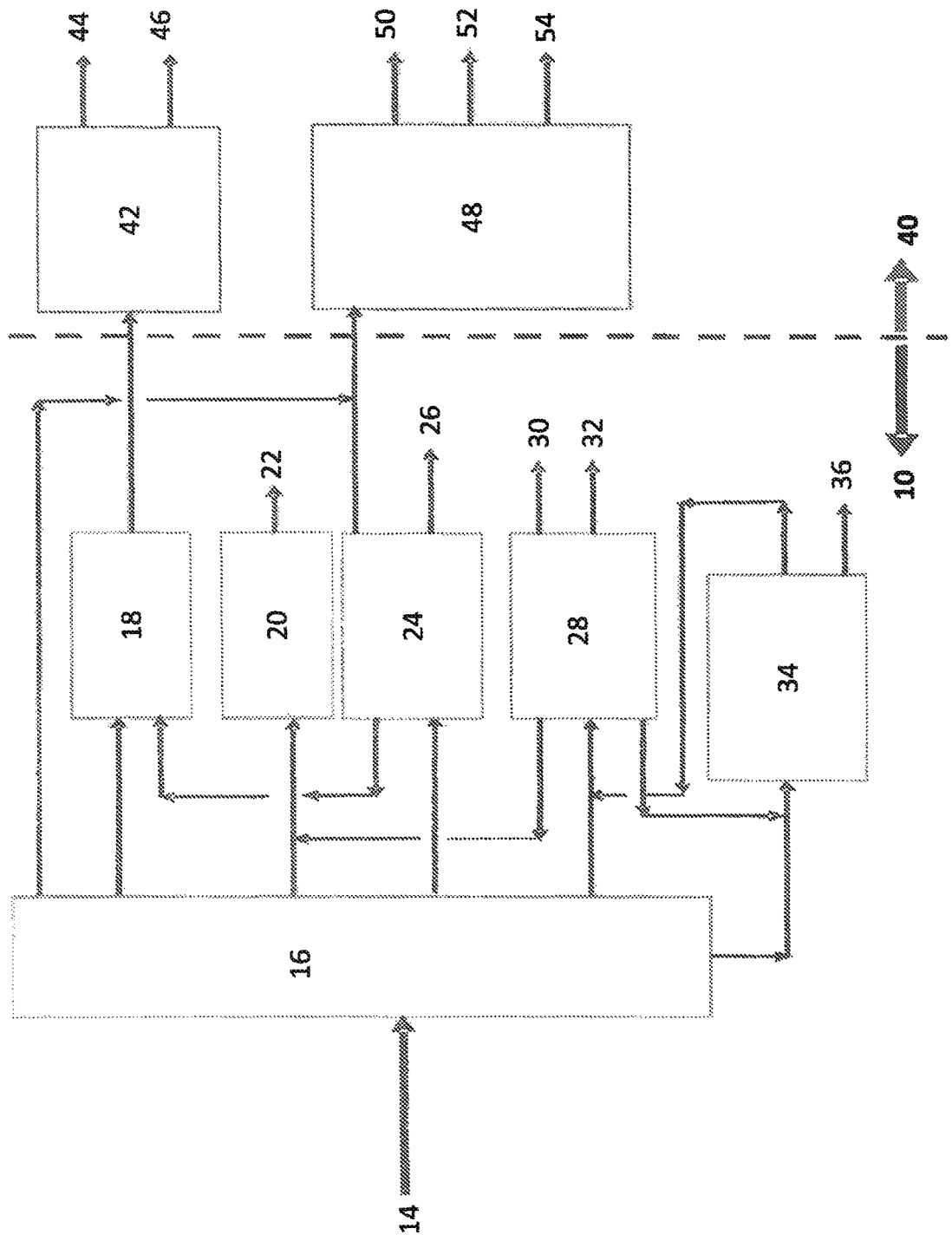
FIG. 1 is a simplified process flow diagram of a typical refinery-petrochemicals complex.

Embodiments herein relate to processes and systems that may directly convert high sulfur fuel oil to petrochemicals. Feedstocks useful in embodiments herein include high sulfur fuel oil (HSFO). HSFO, as used herein, refers to fuel oil having a sulfur content of greater than 1 wt %. Other feedstocks useful in embodiments herein may include pitch from solvent deasphalting units, decant oil, and pyrolysis fuel oil from steam crackers, for example. In some embodiments, the feedstock may be a blend of high sulfur fuel oil and a pyrolysis fuel oil. Feedstocks herein may include vacuum gas oils derived from residue conversion processes, having not only sulfur, but may be high in heavy polynuclear aromatic content as well as nitrogen.

Feedstocks used in embodiments herein typically have a sulfur content of greater than 0.5 wt %, greater than 1.0 wt % in other embodiments, greater than 2.0 wt % in other embodiments, and may be as high as 7.0 wt % in other embodiments. The feedstocks typically have a density of greater than 900 kg/m$^3$ at 15° C., and/or may have a kinematic viscosity of at least 180 mm$^2$/s at 50° C. The feedstocks may have an initial boiling point greater than 350° C. in some embodiments; greater than 450° C. in other embodiments; and, greater than 580° C. in other embodiments. The feedstock typically has an initial boiling point greater than 500° C. While HSFO is defined above as containing greater than 1 wt % sulfur, the values described refer to feedstocks useful in embodiments herein, and feedstocks other the HSFO may have a lower sulfur content.

Feedstocks herein are converted to petrochemicals, including light olefins, using an integrated high pressure hydrocracker, in which the HSFO cracker may be a single high-pressure loop utilizing a two-stage system with recycle. One skilled in the art would generally not propose converting a low hydrogen content feedstock, such as HSFO, to petrochemicals. However, embodiments herein may efficiently and effectively convert such a feedstock to petrochemicals using a combination of catalysts, processing conditions, and processing units as described below.

The HSFO may be converted to vacuum gas oil (VGO) (typically 370° C.-580° C.) products in an ebullated bed or slurry hydrocracking unit. The hydrocracking unit may utilize either extrudates in an ebullated bed reactor (heterogeneous phase reactor using liquid circulation) or slurry catalyst (homogenous phase reactor) in the presence of hydrogen. The slurry catalyst may be used either in a liquid circulating reactor such as the EB reactor or a Slurry Bubble Phase reactor. This fuel oil hydrocracking step is referred to herein as Step 1.

The conversion in the hydrocracking unit is only partial. In some embodiments, unreacted oil or pitch may be fed to a gasifier. The gasifier may be used to convert the unconverted oil or pitch to a synthesis gas, providing hydrogen for the fuel oil hydrocracking and subsequent integrated distillate hydrocracking steps, described below. The gasifier may also be used to generate power, if desired. In other embodiments the heavy fraction (unconverted oil) may be fed to a delayed coking unit or a cement plant. In yet other embodiments, an ultra-low sulfur fuel oil may be recovered from the hydrocracking unit (Step 1), which may either be used internally or sold as high value product.

The fuel oil hydrocracking step (Step 1) is integrated with a hydrocracking step (Step 2) that further converts the products from Step 1 to heavy naphtha, light naphtha, LPG, and lighter products, such as ethane. The products from Step 1 are very aromatic and therefore unsuitable for steam cracking to make olefins. Step 2 hydrogenates the products from Step 1 and hydrocracks the VGO and diesel range material to naphtha that is far more suitable as feed to a downstream ethylene complex, which may include a steam cracker for the production of olefins, for example.

Step 2 and Step 1 may share the same high-pressure hydrogen loop in some embodiments.

Step 2 may include an integrated two-stage hydrocracking system.

Ethane, LPG and/or naphtha products from Step 2 may then be routed to an ethylene complex, which may include a steam cracker. If desired, heavy naphtha from Step 2, rich in naphthenes, may be fed to a reactor for catalytic reforming. The process is also flexible, and where more olefins are desired as compared to aromatics, both the light naphtha stream and a portion or all of the heavy naphtha stream can be routed to the steam cracker.

The ethylene complex and the catalytic reformer both produce hydrogen. The hydrogen may be routed back to Steps 1 and 2. In this manner, the integrated unit may remain in or largely in hydrogen balance, generating the bulk or all of the hydrogen internally. Further, in some embodiments, the pyrolysis gas and/or pyrolysis fuel oil produced in the ethylene complex may be used as an additional feedstock for the fuel oil hydrocracking Step 1.

Ethylene complexes useful in embodiments herein may include various unit operations. For example, an ethylene complex may include a cracker, such as a steam cracker. Other cracking operations may also be used. The ethylene complex may also include an olefins recovery unit, a butadiene extraction unit, a MTBE unit, a C4 selective hydrogenation unit, a pyrolysis gasoline hydrotreating unit, an aromatics extraction unit, a metathesis unit, and/or a disproportionation unit, among others useful for the production and recovery of olefins and other light hydrocarbons. Products from the ethylene complex may include, for example, ethylene, propylene, butadiene, benzene, MTBE, and mixed xylenes, among others.

Processes disclosed herein are not dependent on a refinery to produce petrochemicals. Systems according to embodiments herein may be located right next to a petrochemicals complex with imported high sulfur fuel oil as the only feed, for example. High Sulfur Fuel Oil may be priced much lower than crude following implementation of IMO regulations in 2020, and embodiments herein may convert these low cost feedstocks to higher value petrochemicals. Embodiments herein may also eliminate the need for a refinery and the need to make any transportation fuels from these low value hydrocarbons, may dramatically reduce investment costs with integration, and/or may provide an excellent outlet for pyrolysis fuel oil from a steam cracker.

Figure 2:
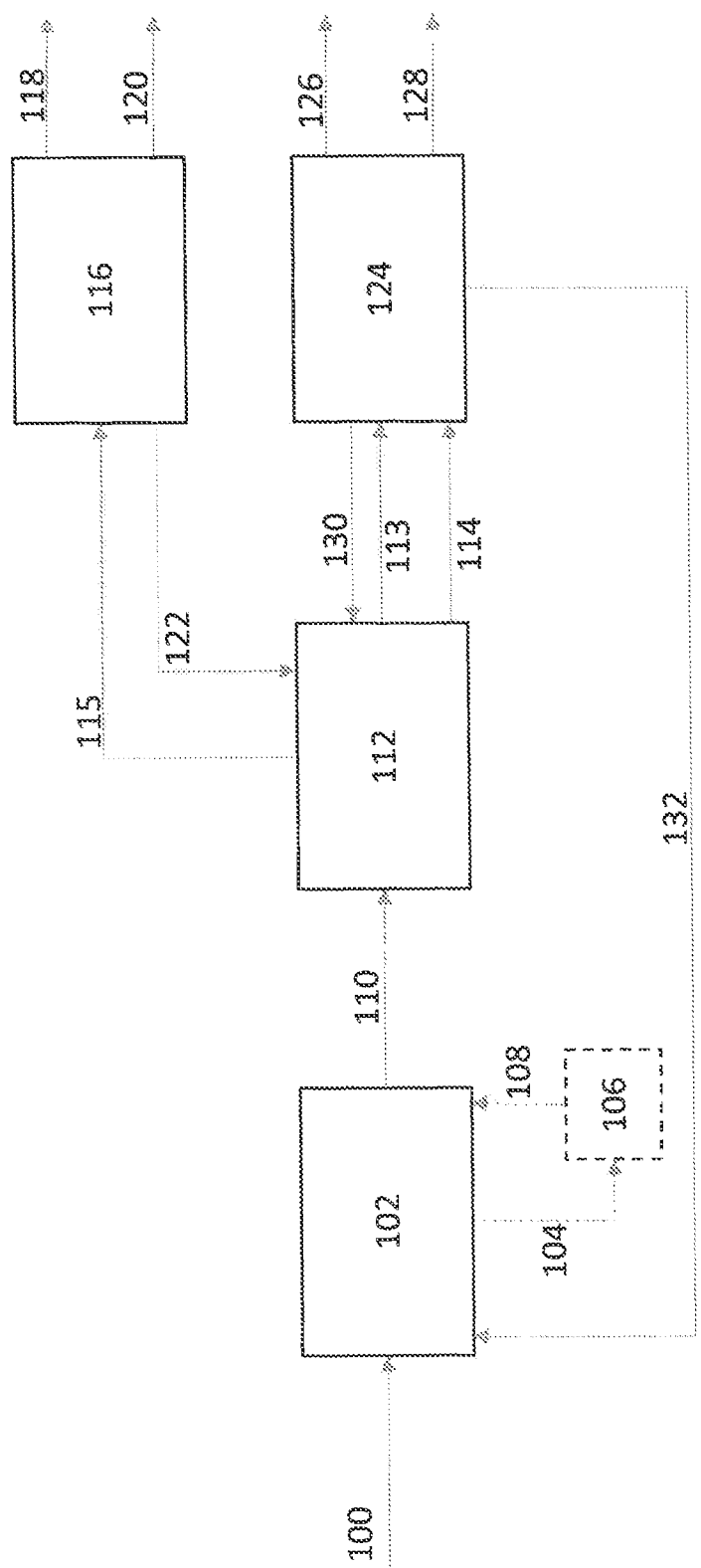
FIG. 2 is a simplified process flow diagram of processes for converting high sulfur fuel oil to petrochemicals according to embodiments herein.

Referring now to FIG. 2, a simplified process flow diagram of processes for converting high sulfur fuel oil to petrochemicals according to embodiments herein is illustrated. A high sulfur fuel oil 100 may be fed to a fuel oil hydrocracking reaction zone 102, which may include one or more slurry or ebullated bed fuel oil hydrocrackers, which may be operated in series and/or parallel. The high sulfur fuel oil 100 may be reacted with hydrogen (from 108, 122, 130 described further below) over a hydrocracking catalyst in the slurry or ebullated bed fuel oil hydrocrackers to convert at least a portion of the fuel oil hydrocarbons to lighter molecules.

The hydrocrackers in the fuel oil reaction zone may be operated at conditions to provide 40 wt % to 98 wt % conversion in some embodiments, for example; greater than 60 wt % conversion in other embodiments; greater than 80 wt % conversion in yet other embodiments. The hydrocracking reaction in the fuel oil hydrocracking reaction zone may be conducted at a temperature in the range from about 360° C. to about 460° C.; from about 400° C. to about 440° C. in other embodiments. Pressures in the fuel oil hydrocracking reaction zone may be in the range from about 70 bara to about 230 bara in some embodiments; from about 100 to about 180 bara in other embodiments. The hydrocracking reactions may also be conducted at a liquid hourly space velocity (LHSV) in the range from about 0.1 $hr^{-1}$ to about 3.0 $hr^{-1}$ in some embodiments; from about 0.2 $hr^{-1}$ to about 2 $hr^{-1}$ in other embodiments.

Hydrocarbon conversion is defined herein as the percentage of material in the reactor feed stream boiling above a temperature threshold hereafter described minus the percentage of the material in the reactor effluent stream boiling above that same temperature threshold with said difference divided by the percentage of material in the reactor feed stream boiling above the temperature threshold. In some embodiments, such as for high sulfur fuel oil conversion, the threshold temperature may be defined as 500° C.+, such as 520° C. or another TBP cut point designated for a feedstock fuel oil grade hydrocarbon; in other embodiments the threshold temperature may be defined as, 540° C.+ and in other embodiments the threshold temperature may be defined as 560° C.+.

The hydrocarbon effluent from the ebullated bed or slurry hydrocracker may then be separated into a light (converted) hydrocarbon fraction 110 and a heavy (unconverted) hydrocarbon fraction 104. The light hydrocarbon fraction may have an end boiling point in the range from about 450° C. to about 550° C., such as about 520° C. in some embodiments. The light hydrocarbon fraction 110 may then be forwarded to a distillate hydrocracking reaction stage 112.

The heavy hydrocarbon fraction 104 may be fed to a gasifier 106 and converted to a synthesis gas, which may include CO and $H_2$, among other byproducts. The synthesis gas, or only the hydrogen separated therefrom, may be used as a feed 108 to provide hydrogen to the fuel oil hydrocracking reaction stage 102 and thence downstream to the distillate hydrocracking reaction stage 112. As noted above, in other embodiments the heavy hydrocarbon fraction 104 (unconverted oil) may be fed to a delayed coking unit or a cement plant (not shown). In yet other embodiments, an ultra-low sulfur fuel oil may be recovered from the hydrocracking unit (Step 1), which may either be used internally or sold as high value product.

Distillate hydrocracking reaction stage 112 may include one or more fixed, ebullated, or slurry hydrocrackers, which may be operated in series and/or parallel. Inter-reactor gas liquid separators may be included to separate out converted products from unconverted residue. The hydrocracking reaction in the distillate hydrocracking reaction stage 112 may be conducted at a temperature in the range from about 300° C. to about 440° C. in some embodiments; from about 360° C. to about 440° C. in other embodiments; and from about 400° C. to about 440° C. in other embodiments. Pressures in the distillate hydrocracking reaction zone may be in the range from about 70 bara to about 230 bara in some embodiments; from about 100 to about 180 bara in other embodiments. The hydrocracking reactions may also be conducted at a liquid hourly space velocity (LHSV) in the range from about 0.1 $hr^{-1}$ to about 4.0 $hr^{-1}$ in some embodiments; from about 0.2 $hr^{-1}$ to about 2.5 $hr^{-1}$ in other embodiments.

The hydrocarbon effluent from the distillate hydrocracker 112 may then be separated into two or more fractions, such as a lights or LPG fraction 113, a light naphtha fraction 114 and a heavy naphtha fraction 115. The LPG fraction 113 and the light naphtha fraction 114 may then be forwarded to a steam cracking reaction stage 124, and the heavy naphtha fraction 115 may be fed to a catalytic reforming reaction zone 116.

Catalytic reforming reaction zone 116 may include a dehydrogenation reactor, if needed, as well as a catalytic aromatization reactor. When the heavy naphtha feed from the distillate hydrocracking reaction is anticipated to be rich in saturated components, the dehydrogenation reactor may be included. The catalyst utilized in the catalytic aromatization reactor may include a catalyst that promotes one or a number of reactions, such as conversion of olefinic and paraffinic molecules to small olefins via cracking and hydrogen transfer, the formation of $C_2$ to $C_{10}$ olefins via transmutation, oligomerization, cracking, and isomerization reactions, and aromatic formation by cyclization and hydrogen transfer. The catalyst may be tailored to the desired reactions based upon the feedstock and conditions employed.

The reaction product from the catalytic reformer may then be processed in a fractionation zone (internal to box 116, not illustrated) to separate the reaction products into two or more hydrocarbon fractions using one or more distillation columns. The resulting hydrocarbon fractions may include benzene fraction 118, paraxylene fraction 120, and hydrogen fraction 122, among other fractions.

The LPG fraction 113 and light naphtha fraction 114 may be fed, as noted above, to a steam cracking reaction zone 124. Steam cracking reaction zone 124 may include a heater containing one or more convective and/or radiant coils for cracking of the light naphtha and LPG in the presence of steam. The steam cracking may be conducted at gas outlet temperatures in excess of 700° C., such as in the range from about 750° C. to about 1100° C. The effluent recovered from the steam hydrocracking system may be separated to recover unreacted hydrogen 130 from the hydrocarbons in the effluent and condense the steam. The effluent hydrocarbons may be fractionated using one or more distillation columns to form two or more hydrocarbon fractions, including one or more light hydrocarbon fractions 126 (propylene, ethylene, etc.), one or more aromatic fractions 128 (benzene, toluene, xylenes, etc.), and a pyrolysis gas oil and/or fuel oil fraction 132.

A flow line may be provided to feed the pyrolysis gas oil fraction to the fuel oil hydrocracker 102, the distillate hydrocracker 112, or both. In some embodiments, the pyrolysis gas oil fraction may be separated in a separator to form a light pyrolysis gas oil fraction and a heavy gas oil fraction, and flow lines may be provided to feed the respective fractions recovered to a desired reactor, such as feeding of the heavy pyrolysis gas oil fraction to the fuel oil hydrocracker 102 and feeding of the light pyrolysis gas oil fraction to the distillate hydrocracker 112.

Hydrogen fractions 122 and 130 recovered from the reformer 116 and steam cracker 124, respectively, may be fed to the fuel oil hydrocracker 102 and/or the distillate hydrocracker 112, as noted above. Hydrogen fractions 108, 122, 130 may allow the system to remain in or near hydrogen balance, generating the bulk or all of the hydrogen internally.

Figure 3:
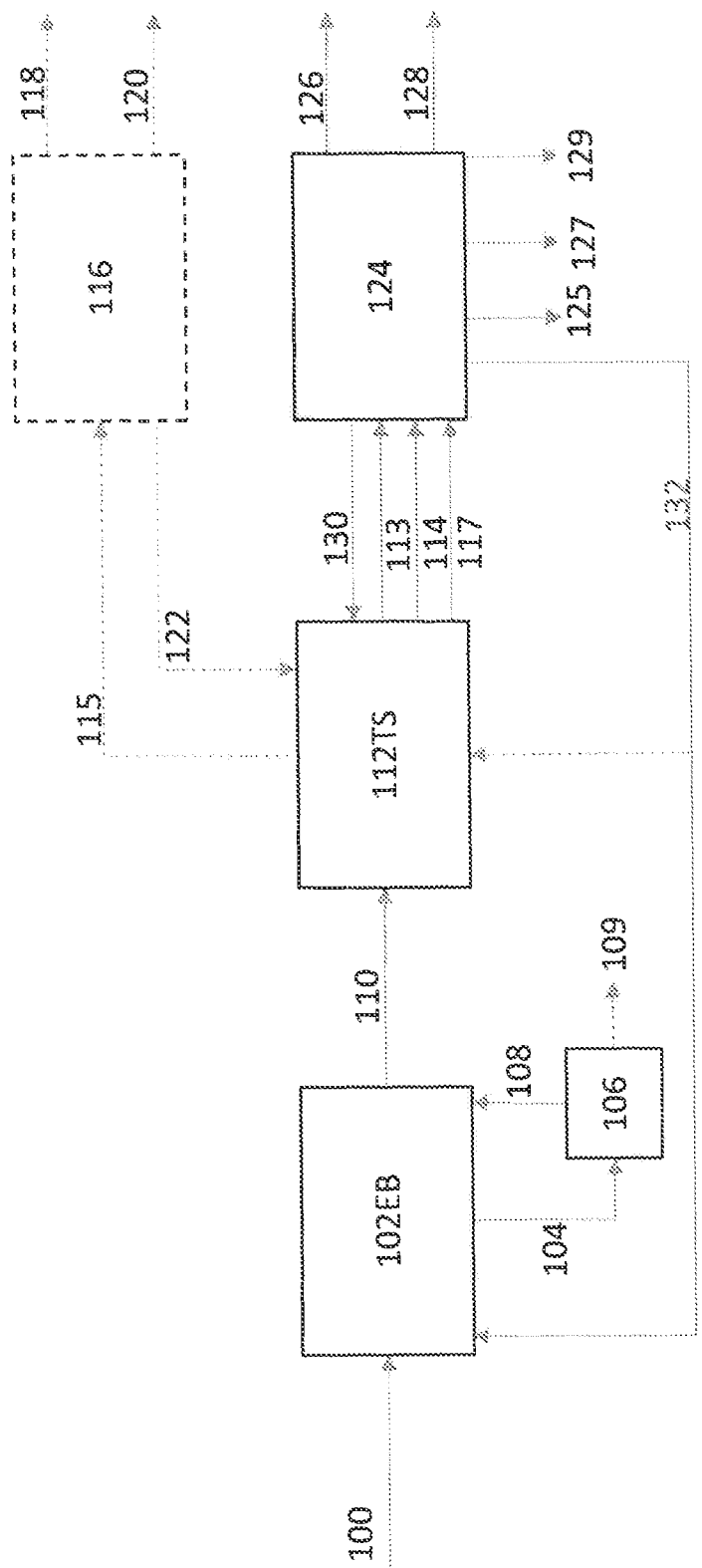
FIG. 3 is a simplified process flow diagram of processes for converting high sulfur fuel oil to petrochemicals according to embodiments herein.
Figure 3A:
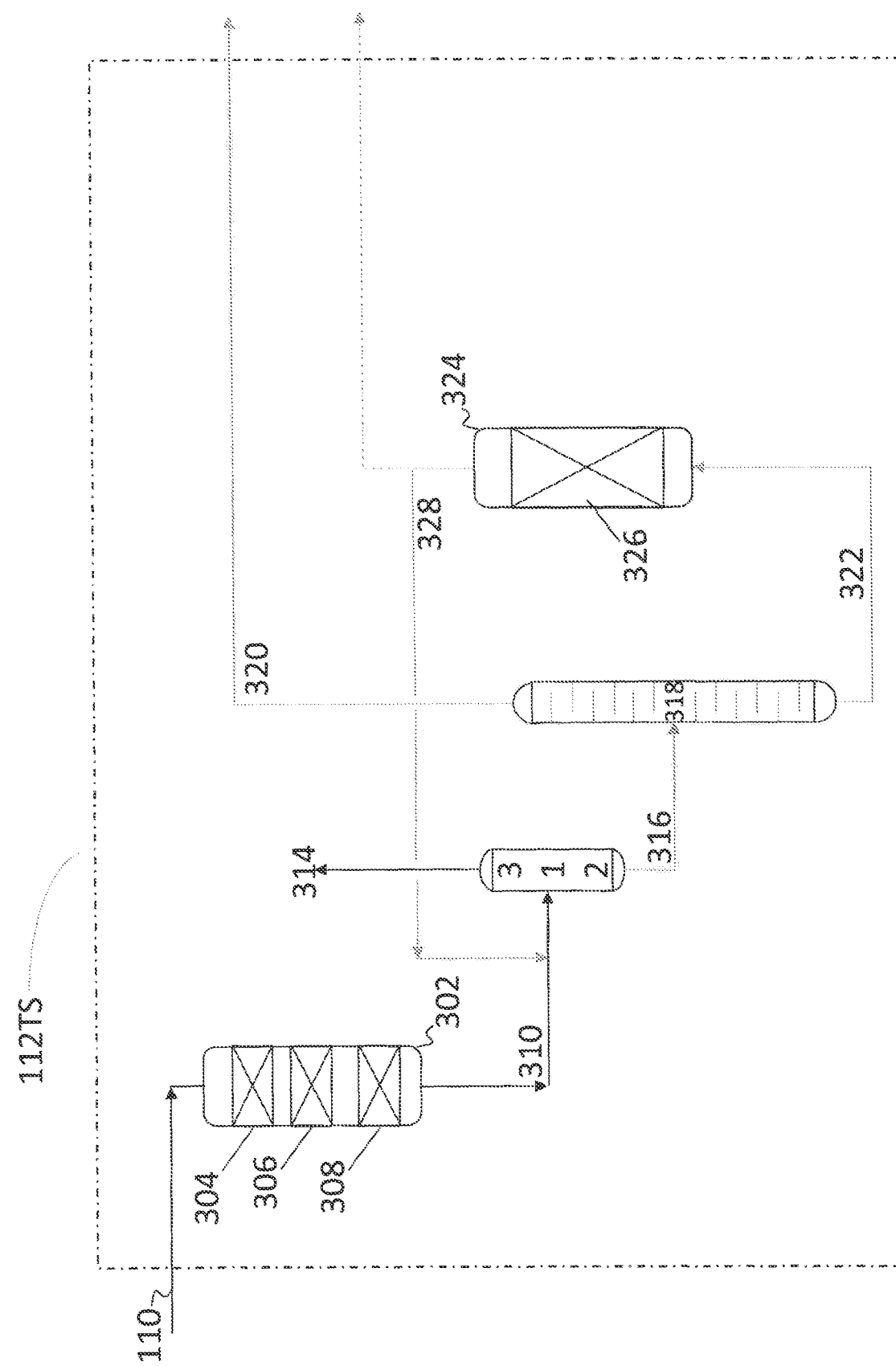
FIG. 3A is a simplified process flow diagram of an integrated two-stage hydrocracking system useful in processes for converting high sulfur fuel oil to petrochemicals according to embodiments herein.

Referring now to FIGS. 3 and 3A, a simplified process flow diagram of processes for converting high sulfur fuel oil to petrochemicals according to embodiments herein is illustrated, where like numerals represent like parts. A high sulfur fuel oil 100 may be fed to a fuel oil hydrocracking reaction zone 102EB, which may include one or more ebullated bed or slurry reactors, which may be operated in series and/or parallel. The high sulfur fuel oil 100 may be reacted with hydrogen (from 108, 122, 130 described further below) over a one or more catalysts with specific functions designed for hydrodemetallation, hydrodesulfurization, CCR conversion, hydrodenitrification, aromatic saturation and hydrocracking. Part of the conversion process is thermal and part catalytic. In the fuel oil hydrocrackers the process of thermal and catalytic conversion converts at least a portion of the fuel oil hydrocarbons to lighter molecules. The hydrocracking catalyst in the ebullated bed or slurry bed reactors may have a very high hydrogenation activity, which may maximize hydrodesulfurization, among other reactions. Depending on the reactor used in the fuel oil hydrocracking step, the catalyst may be Ni, Mo on silica alumina base or an organic molybdenum component or a molybdenum salt promoted by another base metal.

The hydrocrackers in the fuel oil reaction zone may be operated at conditions to provide 40 wt % to 90 wt % conversion in some embodiments, for example; greater than 60 wt % conversion in other embodiments; greater than 80 wt % conversion in yet other embodiments. The hydrocracking reaction in the fuel oil hydrocracking reaction zone may be conducted at a temperature in the range from about 360° C. to about 460° C.; from about 390° C. or 400° C. to about 440° C. in other embodiments. Pressures in the fuel oil hydrocracking reaction zone may be in the range from about 70 bara to about 230 bara in some embodiments; from about 100 to about 200 bara in other embodiments, such as from about 170 bara to about 195 bara in other embodiments. The hydrocracking reactions may also be conducted at a liquid hourly space velocity (LHSV) in the range from about 0.1 $h^{-1}$ to about 3.0 $h^{-1}$ in some embodiments; from about 0.2 $h^{-1}$ to about 2 $h^{-1}$ in other embodiments, such as from about 0.1 $h^{-1}$ to about 0.5 $h^{-1}$ in other embodiments.

The effluent from the ebullated bed hydrocracking reaction zone 102EB may include a mixture of hydrocarbons, including light and heavy naphtha, diesel, and vacuum gas oil range hydrocarbons. The light naphtha range products may include 60-75 wt % paraffins, 15-30 wt % naphthenes, 2-10 wt % aromatics, as well as up to 50 wppm nitrogen and up to 500 wppm sulfur, for example. The heavy naphtha range products may include 20-50 wt % paraffins, 35-55 wt % naphthenes, 12-20 wt % aromatics, as well as up to 150 wppm nitrogen and up to 200 wppm sulfur, for example. The diesel range products may include 15-35 wt % paraffins, 15-30 wt % naphthenes, 35-55 wt % aromatics, as well as up to 750 wppm nitrogen and up to 2000 wppm sulfur, for example. The VGO range products may include 15-25 wt % paraffins, 15-30 wt % naphthenes, 40-60 wt % aromatics, as well as up to 3500 wppm sulfur and nitrogen and in the range from about 10,000 wppm up to about 25,000 wppm heavy polynuclear aromatics (having 4+ rings), for example. Each of these product fractions is unsuitable as a feedstock for a steam cracker, as they may result in rapid fouling, poor conversion to olefins (low ethylene yield), may result in a high yield of pyrolysis fuel oil, and/or may rapidly convert to coke at the high temperatures in a steam cracker. The heavy naphtha is unsuitable as feed to a catalytic reformer because it has very high sulfur and nitrogen when most catalytic reforming catalysts require the sulfur and nitrogen content to be less than 0.5 parts per million.

To improve the convertibility of the effluent from the First Step fuel oil hydrocracking, the effluent from the fuel oil hydrocracker(s) may then be separated into a light (converted) hydrocarbon fraction 110 and a heavy (unconverted) hydrocarbon fraction 104. The light hydrocarbon fraction may have an end boiling point in the range from about 450° C. to about 550° C., such as about 520° C. in some embodiments. The light hydrocarbon fraction 110 may then be forwarded to a two-stage distillate hydrocracking reaction stage 112TS, as further illustrated in FIG. 3A.

The heavy hydrocarbon fraction 104 may be fed to a gasifier 106 and converted to a synthesis gas, which may include CO and $H_2$, among other byproducts. The synthesis gas, or only the hydrogen separated therefrom, may be used as a feed 108 to provide hydrogen to the fuel oil hydrocracking reaction stage 102 and thence downstream to the distillate hydrocracking reaction stage 112TS. Turbines and other equipment associated with the gasifier 106 may also be used to generate a power output 109.

Two-stage distillate hydrocracking reaction stage 112TS may include one or more fixed, ebullated, or slurry hydrocrackers, which may be operated in series and/or parallel. In some embodiments, the two-stage distillate hydrocracking reaction stage 112TS may include a first stage reactor(s) including a mixture of catalysts to perform hydrotreating, deep hydrogenation, ring opening, and hydrodenitrogenation, and hydrocracking.

In some embodiments, for example, the first stage may include a fixed bed reactor 302 containing: in a first contact bed 304, a Type II hydrotreating catalyst, such as a Ni—Mo catalyst; in a second contact bed 306, an unsupported tri-metallic catalyst system targeting deep hydrogenation, ring opening, and hydrodenitrogenation; and, in a third contact bed 308, a layer of nitrogen-tolerant hydrocracking catalyst, which may be amorphous or zeolitic with base metals such as Ni, Mo or W.

The reactor effluent 310 from Stage 1 may be flashed, such as in a flash drum or separator 312, to recover a vapor fraction 314, which may include hydrogen for recycle as well as remove ammonia and hydrogen sulfide from the hydrocarbons. The remaining hydrocarbon effluent 316 may then be directed to an intermediate fractionator or separation zone 318 to recover various hydrocarbon fractions. The overhead and/or side-draw fractions recovered from fractionator 318 may include one or more light hydrocarbon fractions 320, such as one or more C2-C12 fractions (C2, C3, C4, C5, C6, C7, C8, C9, C10, C11, C12, individually or combinations thereof). A heavy fraction, including unconverted hydrocarbons (oil) from Stage 1 may be recovered from fractionator or separation zone 318 via flow stream 322.

The unconverted oils from stage 1 may then be converted in Stage 2 reactor(s), which may include one or more fixed, ebullated, or slurry hydrocrackers, which may be operated in series and/or parallel. The second stage reactor(s) 324 may contain a hydrocracking catalyst 326 for converting the unconverted oil from Stage 1 to a very hydrogenated naphtha and lighter products, recovered as effluent 328, which may be recovered in the common fractionator 318 along with Stage 1 effluent or in a separate dedicated fractionator (not shown). The hydrocracking catalyst in the second stage may be either zeolitic or amorphous or a mixture of both. The catalyst may include base metals such as Ni, Mo or W or noble metals such as platinum or palladium. The hydrocracking catalyst may be layered with hydrotreating catalysts in some embodiments.

The light naphtha range products from Stage 2 may include 75-85 wt % paraffins, 15-20 wt naphthenes, 2-5 wt % aromatics, and less than 1 wppm sulfur and nitrogen, for example. The heavy naphtha range products may include 40-50 wt % paraffins, 45-50 wt % naphthenes, 8-10 wt % aromatics, and less than 0.5 wppm nitrogen and sulfur, for example.

In some embodiments, the whole naphtha yield from hydrocracking reaction stage 112TS may be in the range from about 85-92 wt %. Further, the C2 fraction 117, C3/LPG fraction 113, and light naphtha products 114 recovered may be ideal feedstocks for a downstream steam cracker or pyrolysis furnace in an ethylene cracker complex 124, as described above with respect to FIG. 2. In some embodiments, streams 320, 328 may be fed directly to the ethylene complex 124. In other embodiments, streams 320 and/or 328 may be separated into multiple fractions for separate processing (cracking, for example, at preferred temperatures, pressures, and residence times for each respective fraction). In some embodiments, for example, the effluent 328 from the second stage may be separated to recover a light naphtha fraction 114 and a heavy naphtha fraction 115, which may be processed as described above with respect to FIG. 2, in a cracking zone 124 and optionally a reforming zone 116.

The hydrocracking reaction in the distillate hydrocracking reaction stage 112TS may be conducted at a temperature in the range from about 280° C. or 300° C. to about 440° C. in some embodiments; from about 360° C. to about 440° C. in other embodiments; and from about 330° C. to about 440° C. in other embodiments. Pressures in the distillate hydrocracking reaction zone may be in the range from about 70 bara to about 230 bara in some embodiments; from about 100 to about 200 bara in other embodiments, such as from about 140 to about 190 bara. The hydrocracking reactions may also be conducted at a liquid hourly space velocity (LHSV) in the range from about 0.1 $h^{-1}$ to about 4.0 $h^{-1}$ in some embodiments; from about 0.2 $h^{-1}$ to about 2.5 $h^{-1}$ in other embodiments, such as from about 0.5 $h^{-1}$ to about 2.5 or 3.0 $h^{-1}$, for example.

In the first stage, for example, the reactions may be conducted at a temperature in the range from about 300° C. to about 440° C. in some embodiments; from about 320° C. to about 440° C. in other embodiments; and from about 340° C. to about 430° C. in other embodiments. Pressures in the first stage reaction zone may be in the range from about 70 bara to about 230 bara in some embodiments; from about 100 to about 200 bara in other embodiments, such as from about 140 to about 190 bara or from about 150 bara to about 180 bara in other embodiments. The hydrocracking reactions in the first stage reaction zone may also be conducted at a liquid hourly space velocity (LHSV) in the range from about 0.1 $h^{-1}$ to about 4.0 $h^{-1}$ in some embodiments; from about 0.2 $h^{-1}$ to about 3.0 $h^{-1}$ in other embodiments, such as from about 0.5 $h^{-1}$ to about 2.5 $h^{-1}$, for example.

In the second stage, for example, the reactions may be conducted at a temperature in the range from about 280° C. to about 440° C. in some embodiments; from about 300° C. to about 400° C. in other embodiments; and from about 320° C. to about 380° C. in other embodiments. Pressures in the second stage reaction zone may be in the range from about 70 bara to about 230 bara in some embodiments; from about 100 to about 200 bara in other embodiments, such as from about 140 to about 190 bara or from about 150 bara to about 180 bara in other embodiments. The hydrocracking reactions in the second stage reaction zone may also be conducted at a liquid hourly space velocity (LHSV) in the range from about 0.1 $h^{-1}$ to about 4.0 $h^{-1}$ in some embodiments; from about 0.2 $h^{-1}$ to about 3.5 $h^{-1}$ in other embodiments, such as from about 0.5 $h^{-1}$ to about 3.0 $h^{-1}$ in other embodiments.

Referring again to FIG. 3, as noted above, the hydrocarbon effluents 320, 328 from the two-stage distillate hydrocracking reaction zone 112TS may be forwarded to an ethylene complex to produce petrochemicals. In some embodiments, one or both of fractions 320, 328 may be separated into two or more fractions, such as a lights fraction 117, a C3 or LPG fraction 113, a light naphtha fraction 114 and a heavy naphtha fraction 115, for example. The lights (C2) fraction 117, the C3/LPG fraction 113 and the light naphtha fraction 114 may then be forwarded to a steam cracking reaction stage 124. In some embodiments, a heavy fraction, such as a heavy naphtha fraction 115 or other heavy fractions containing unconverted effluent from the fuel oil hydrocracker and/or the first or second stage hydrocrackers may optionally be fed to a catalytic reforming reaction zone 116.

Catalytic reforming reaction zone 116, when present, may include a dehydrogenation reactor, if needed, as well as a catalytic aromatization reactor. When the heavy naphtha feed from the distillate hydrocracking reaction is anticipated to be rich in saturated components, the dehydrogenation reactor may be included. The catalyst utilized in the catalytic aromatization reactor may include a catalyst that promotes one or a number of reactions, such as conversion of olefinic and paraffinic molecules to small olefins via cracking and hydrogen transfer, the formation of $C_2$ to $C_{10}$ olefins via transmutation, oligomerization, cracking, and isomerization reactions, and aromatic formation by cyclization and hydrogen transfer. The catalyst used in the reforming reaction zone 116 may be tailored to the desired reactions based upon the feedstock and conditions employed.

The reaction product from the catalytic reformer may then be processed in a fractionation zone (internal to zone 116, not illustrated) to separate the reaction products into two or more hydrocarbon fractions using one or more distillation columns. The resulting hydrocarbon fractions may include, for example, benzene fraction 118, paraxylene fraction 120, and hydrogen fraction 122, among other fractions.

The lights fraction 117, C3/LPG fraction 113 and light naphtha fraction 114 may be fed, as noted above, to a steam cracking reaction zone 124. Steam cracking reaction zone 124 may include a heater containing one or more convective and/or radiant coils for cracking of the light naphtha and LPG in the presence of steam. The steam cracking may be conducted at gas outlet temperatures in excess of 700° C., such as in the range from about 750° C. to about 1100° C. The effluent recovered from the steam hydrocracking system may be separated to recover unreacted hydrogen 130 from the hydrocarbons in the effluent and condense the steam. The effluent hydrocarbons may be fractionated using one or more distillation columns to form two or more hydrocarbon fractions, including, for example, one or more light hydrocarbon fractions 125, 126 (propylene, ethylene, etc.), a butadiene or C4-containing fraction 127, one or more aromatic fractions 128, 129 (benzene, toluene, xylenes, etc.), and a pyrolysis gas oil and/or fuel oil fraction 132.

A flow line may be provided to feed the pyrolysis gas oil fraction to the fuel oil hydrocracker 102EB, the distillate hydrocracker 112TS, or both. In some embodiments, the pyrolysis gas oil fraction may be separated in a separator to form a light pyrolysis gas oil fraction and a heavy gas oil fraction, and flow lines may be provided to feed the respective fractions recovered to a desired reactor or reaction stage, such as feeding of the heavy pyrolysis gas oil fraction to the fuel oil hydrocracker 102 and feeding of the light pyrolysis gas oil fraction to the distillate hydrocracker 112TS.

Hydrogen fractions 122 and 130 recovered from the reformer 116 and steam cracker 124, respectively, may be fed to the fuel oil hydrocracker 102EB and/or the distillate hydrocracker 112TS, as noted above. Hydrogen fractions 108, 122, 130 may allow the system to remain in or near hydrogen balance, generating the bulk or all of the hydrogen internally.

Figure 4:
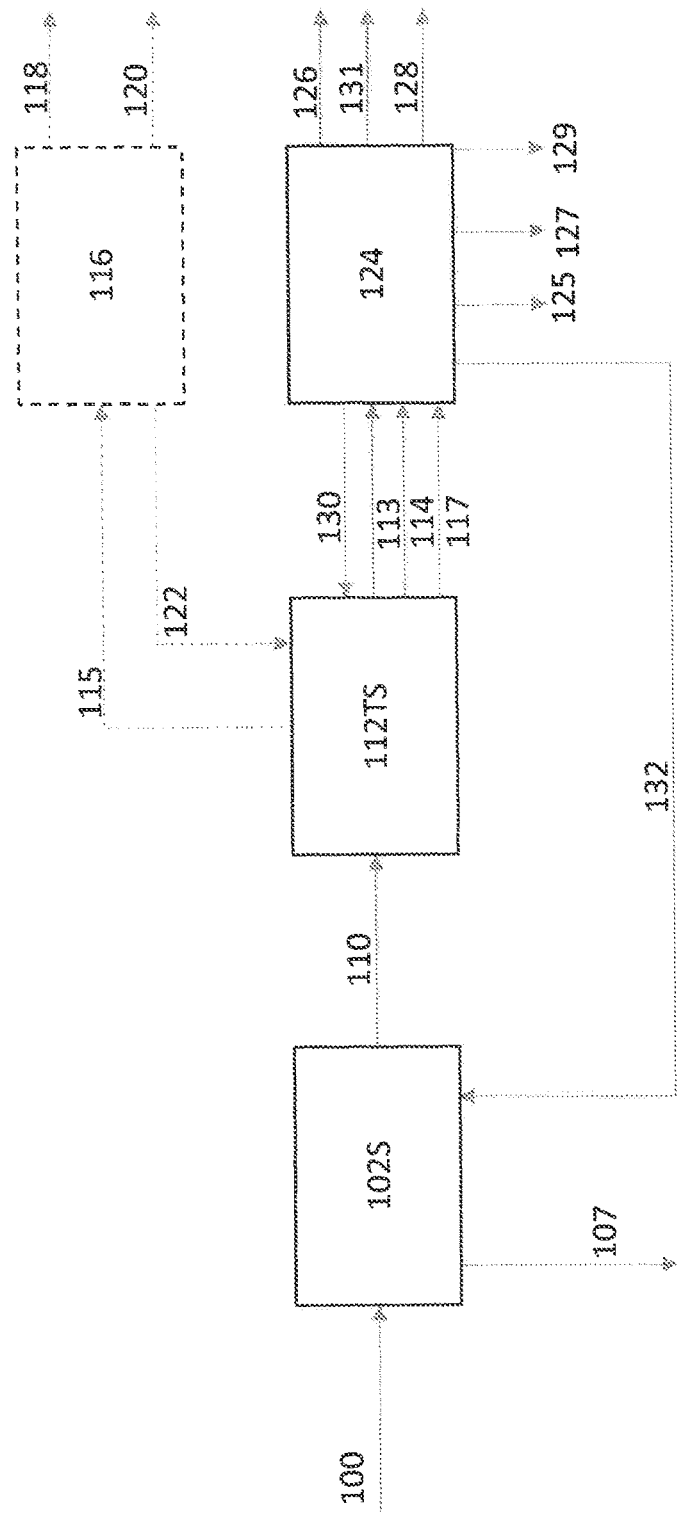
FIG. 4 is a simplified process flow diagram of processes for converting high sulfur fuel oil to petrochemicals according to embodiments herein.

Referring now to FIG. 4, a simplified process flow diagram of processes for converting high sulfur fuel oil to petrochemicals according to embodiments herein is illustrated, where like numerals represent like parts. A high sulfur fuel oil 100 may be fed to a fuel oil hydrocracking reaction zone 102S, which may include one or more slurry fuel oil hydrocrackers, which may be operated in series and/or parallel. The high sulfur fuel oil 100 may be reacted with hydrogen (from 108, 122, 130 described further below) over a hydrocracking catalyst in the slurry fuel oil hydrocrackers to convert at least a portion of the fuel oil hydrocarbons to lighter molecules. The hydrocracking catalyst in the slurry reactor may have a very high hydrogenation activity, which may maximize hydrodenitrogenation, among other reactions.

The hydrocrackers in the fuel oil reaction zone 102S may be operated at conditions to provide 40 wt % to 98 wt % conversion in some embodiments, for example; greater than 60 wt/% conversion in other embodiments; greater than 80 wt % conversion in yet other embodiments. The hydrocracking reaction in the fuel oil hydrocracking reaction zone 102S may be conducted at a temperature in the range from about 360° C. to about 460° C.; from about 390° C. or 400° C. to about 440° C. in other embodiments. Pressures in the fuel oil hydrocracking reaction zone may be in the range from about 70 bara to about 230 bara in some embodiments; from about 100 to about 200 bara in other embodiments, such as from about 170 bara to about 195 bara in other embodiments. The hydrocracking reactions may also be conducted at a liquid hourly space velocity (LHSV) in the range from about $0.1$ $h^{-1}$ to about $3.0$ $h^{-1}$ in some embodiments; from about $0.2$ $h^{-1}$ to about $2$ $h^{-1}$ in other embodiments, such as from about $0.1$ $h^{-1}$ to about $0.5$ $h^{-1}$ in other embodiments.

The effluent from the slurry hydrocracking reaction zone 102S may include a mixture of hydrocarbons, including light and heavy naphtha, diesel, and vacuum gas oil range hydrocarbons. The light naphtha range products may include 60-75 wt % paraffins, 15-30 wt % naphthenes, 2-10 wt % aromatics, as well as up to 50 wppm nitrogen and up to 500 wppm sulfur, for example. The heavy naphtha range products may include 20-50 wt % paraffins, 35-55 wt % naphthenes, 12-20 wt % aromatics, as well as up to 150 wppm nitrogen and up to 200 wppm sulfur, for example. The diesel range products may include 15-35 wt % paraffins, 15-30 wt % naphthenes, 35-55 wt % aromatics, as well as up to 750 wppm nitrogen and up to 2000 wppm sulfur, for example. The VGO range products may include 15-25 wt % paraffins, 15-30 wt % naphthenes, 40-60 wt % aromatics, as well as up to 1000 wppm sulfur and nitrogen and in the range from about 10,000 wppm up to about 25,000 wppm heavy polynuclear aromatics (having 4+ rings), for example. Each of these product fractions is unsuitable as a feedstock for a steam cracker, as they may result in rapid fouling, poor conversion to olefins (low ethylene yield), may result in a high yield of pyrolysis fuel oil, and/or may rapidly convert to coke at the high temperatures in a steam cracker.

To improve the convertibility of the effluent from the First Step slurry bed hydrocracking, the effluent from the ebullated bed hydrocracker may then be separated into a light (converted) hydrocarbon fraction 110 and a heavy (unconverted) hydrocarbon fraction 107, such as an ultra-low sulfur fuel oil fraction, which may either be used internally or sold as high value product. The light hydrocarbon fraction may have an end boiling point in the range from about 450° C. to about 550° C., such as about 520° C. in some embodiments. The light hydrocarbon fraction 110 may then be forwarded to a two-stage distillate hydrocracking reaction stage 112TS, and processed similar to that as described above with respect to FIGS. 3 and 3A. In other embodiments the heavy fraction (unconverted oil) may be fed to a gasifier, a delayed coking unit or a cement plant (not shown), as described above.

Two-stage distillate hydrocracking reaction stage 112TS may include one or more fixed, ebullated, or slurry hydrocrackers, which may be operated in series and/or parallel. In some embodiments, the two-stage distillate hydrocracking reaction stage 112TS may include a first stage reactor(s)

including a mixture of catalysts to perform hydrotreating, deep hydrogenation, ring opening, and hydrodenitrogenation, and hydrocracking.

In some embodiments, for example, the first stage may include a fixed bed reactor 302 containing: in a first contact bed 304, a Type II hydrotreating catalyst, such as a Ni—Mo catalyst; in a second contact bed 306, an unsupported tri-metallic catalyst system targeting deep hydrogenation, ring opening, and hydrodenitrogenation; and, in a third contact bed 308, a layer of nitrogen-tolerant hydrocracking catalyst.

The reactor effluent 310 from Stage 1 may be flashed, such as in a flash drum or separator 312, to recover a vapor fraction 314, which may include hydrogen for recycle as well as remove ammonia and hydrogen sulfide from the hydrocarbons. The remaining hydrocarbon effluent 316 may then be directed to an intermediate fractionator or separation zone 318 to recover various hydrocarbon fractions. The overhead and/or side-draw fractions recovered from fractionator 318 may include one or more light hydrocarbon fractions 320, such as one or more C2-C12 fractions (C2, C3, C4, C5, C6, C7, C8, C9, C10, C11, C12, individually or combinations thereof). A heavy fraction, including unconverted hydrocarbons (oil) from Stage 1 may be recovered from fractionator or separation zone 318 via flow stream 322.

The unconverted oils from stage 1 may then be converted in Stage 2 reactor(s), which may include one or more fixed, ebullated, or slurry hydrocrackers, which may be operated in series and/or parallel. The second stage reactor(s) 324 may contain a hydrocracking catalyst 326 for converting the unconverted oil from Stage 1 to a very hydrogenated naphtha and lighter products, recovered as effluent 328.

The light naphtha range products from Stage 2 may include 75-85 wt % paraffins, 15-20 wt %/o naphthenes, 2-5 wt % aromatics, and less than 1 wppm sulfur and nitrogen, for example. The heavy naphtha range products may include 40-50 wt % paraffins, 45-50 wt % naphthenes, 8-10 wt % aromatics, and less than 0.5 wppm nitrogen and sulfur, for example.

In some embodiments, the whole naphtha yield from hydrocracking reaction stage 112TS may be in the range from about 85-92 wt %. Further, the C2 fraction 113, C3/LPG fraction 114, and naphtha products 117 (light or full range) recovered may be ideal feedstocks for a downstream steam cracker or pyrolysis furnace in an ethylene cracker complex 124, as described above with respect to FIGS. 2 and 3. In some embodiments, streams 320, 328 may be fed directly to the ethylene complex 124. In other embodiments, streams 320 and/or 328 may be separated into multiple fractions for separate processing (cracking, for example, at preferred temperatures, pressures, and residence times for each respective fraction). In some embodiments, for example, the effluent 328 from the second stage may be separated to recover a full range naphtha fraction 117 fed to the ethylene complex 124. In other embodiments, for example, the effluent 328 may be separated to recover a light naphtha fraction 117 and a heavy naphtha fraction 115, which may be processed as described above with respect to FIG. 3, in a cracking zone 124 and optionally a reforming zone 116.

The hydrocracking reaction in the distillate hydrocracking reaction stage 112TS may be conducted at a temperature in the range from about 280° C. or 300° C. to about 440° C. in some embodiments; from about 360° C. to about 440° C. in other embodiments; and from about 330° C. to about 440° C. in other embodiments. Pressures in the distillate hydrocracking reaction zone may be in the range from about 70 bara to about 230 bara in some embodiments; from about 100 to about 200 bara in other embodiments, such as from about 140 to about 190 bara. The hydrocracking reactions may also be conducted at a liquid hourly space velocity (LHSV) in the range from about 0.1 $h^{-1}$ to about 4.0 $h^{-1}$ in some embodiments; from about 0.2 $h^{-1}$ to about 2.5 $h^{-1}$ in other embodiments, such as from about 0.5 $h^{-1}$ to about 2.5 or 3.0 $h^{-1}$, for example.

In the first stage, for example, the reactions may be conducted at a temperature in the range from about 300° C. to about 460° C. in some embodiments; from about 320° C. to about 440° C. in other embodiments; and from about 340° C. to about 430° C. in other embodiments. Pressures in the first stage reaction zone may be in the range from about 70 bara to about 230 bara in some embodiments; from about 100 to about 200 bara in other embodiments, such as from about 140 to about 190 bara or from about 150 bara to about 180 bara in other embodiments. The hydrocracking reactions in the first stage reaction zone may also be conducted at a liquid hourly space velocity (LHSV) in the range from about 0.1 $h^{-1}$ to about 4.0 $h^{-1}$ in some embodiments; from about 0.2 $h^{-1}$ to about 3.0 $h^{-1}$ in other embodiments, such as from about 0.5 $h^{-1}$ to about 2.5 $h^{-1}$, for example.

In the second stage, for example, the reactions may be conducted at a temperature in the range from about 280° C. to about 440° C. in some embodiments; from about 300° C. to about 400° C. in other embodiments; and from about 320° C. to about 380° C. in other embodiments. Pressures in the second stage reaction zone may be in the range from about 70 bara to about 230 bara in some embodiments; from about 100 to about 200 bara in other embodiments, such as from about 140 to about 190 bara or from about 150 bara to about 180 bara in other embodiments. The hydrocracking reactions in the second stage reaction zone may also be conducted at a liquid hourly space velocity (LHSV) in the range from about 0.1 $h^{-1}$ to about 4.0 $h^{-1}$ in some embodiments; from about 0.2 $h^{-1}$ to about 3.5 $h^{-1}$ in other embodiments, such as from about 0.5 $h^{-1}$ to about 3.0 $h^{-1}$ in other embodiments.

Referring again to FIG. 4, as noted above, the hydrocarbon effluents 320, 328 from the two-stage distillate hydrocracking reaction zone 112TS may be forwarded to an ethylene complex to produce petrochemicals. In some embodiments, one or both of fractions 320, 328 may then be separated into two or more fractions, such as a lights (C2) fraction 117, a C3 or LPG fraction 113, and a naphtha fraction 114. The lights fraction 117, C3/LPG fraction 113 and the naphtha fraction 114 may then be forwarded to a steam cracking reaction stage 124; if recovered, a heavy fraction 115 may be fed to a catalytic reforming reaction zone 116, as described above with respect to FIG. 3.

The lights fraction 117, C3/LPG fraction 113 and naphtha fraction 114 may be fed, as noted above, to a steam cracking reaction zone 124. Steam cracking reaction zone 124 may include a heater containing one or more convective and/or radiant coils for cracking of the light naphtha and LPG in the presence of steam. The steam cracking may be conducted at gas outlet temperatures in excess of 700° C., such as in the range from about 750° C. to about 1100° C. The effluent recovered from the steam hydrocracking system may be separated to recover unreacted hydrogen 130 from the hydrocarbons in the effluent and condense the steam. The effluent hydrocarbons may be fractionated using one or more distillation columns to form two or more hydrocarbon fractions, including, for example, one or more light hydrocarbon fractions 125, 126 (propylene, ethylene, etc.), a butadiene or C4-containing fraction 127, one or more aromatic fractions 128, 129 (benzene, toluene, xylenes, etc.), and a pyrolysis gas oil and/or fuel oil fraction 132. In some embodiments, the ethylene cracker complex 124 may include a MTBE unit, producing a fraction 131 comprising MTBE.

A flow line may be provided to feed the pyrolysis gas oil fraction to the fuel oil hydrocracker 102S, the distillate hydrocracker 112TS, or both. In some embodiments, the pyrolysis gas oil fraction may be separated in a separator to form a light pyrolysis gas oil fraction and a heavy gas oil fraction, and flow lines may be provided to feed the respective fractions recovered to a desired reactor or reaction stage, such as feeding of the heavy pyrolysis gas oil fraction to the fuel oil hydrocracker 102S and feeding of the light pyrolysis gas oil fraction to the distillate hydrocracker 112TS.

Hydrogen fractions 122 and 130 recovered from the reformer 116 and steam cracker 124, respectively, may be fed to the fuel oil hydrocracker 102S and/or the distillate hydrocracker 112TS, as noted above. Hydrogen fractions 122, 130 may allow the system to remain in or near hydrogen balance, generating the bulk or all of the hydrogen internally.

As described above, catalysts useful in Step 1, the ebullated bed or slurry hydrocracking reaction zone, may include catalysts having a very high hydrogenation activity, and may maximize hydrodenitrogenation, among other reactions. Exemplary catalysts that may be used include extrudates or liquid circulation catalysts suitable for use in ebullated bed and/or slurry reactors, or other catalysts suitable for other types of reactors that may be used, including the fixed bed reactors noted above.

In ebullated bed reactors, the catalysts may include hydrodemetallation catalysts with Ni and Mo over silica alumina with a very high pore size followed by Ni—Mo catalysts with progressively lower pore size and higher surface area to achieve the target levels of HDS, DCCR, and asphaltene conversion without excessive sediment formation. In slurry bed reactors, the catalyst may be either an organo-moly compound in nano-scale or micron-sized molybdenum sulfide promoted by another base metal such as Ni. The catalyst systems are designed for maximum conversion with hydrogenation always remaining ahead of the limit of resin destruction that would lead to residual asphaltene (unconverted asphaltene) precipitation.

Catalysts useful in Step 2 Stage 1 may include a catalyst or a mixture of catalysts to perform hydrotreating, deep hydrogenation, ring opening, and hydrodenitrogenation, and hydrocracking. In some embodiments, Step 2 Stage 1 reactor(s) may contain multiple beds of catalyst, where a first layer may include a Type II hydrotreating catalyst, such as a Ni—Mo catalyst; in a second contact bed may be disposed an unsupported tri-metallic catalyst system targeting deep hydrogenation, ring opening, and hydrodenitrogenation; and, in a third contact bed, a layer of nitrogen-tolerant hydrocracking catalyst may be used.

Examples of Type II hydrotreating catalysts may include chelated Ni—Mo or Co—Mo or Ni—Co—Mo catalysts dispersed over a porous material, typically alumina. The advance in these catalysts compared to traditional hydrotreating catalysts is the access to the metals where the hydrogenation and sulfur removal takes place and modulation of porosity.

The unsupported tri-metallic catalyst may be, for example, a Ni—W—Mo catalyst. The all metal catalyst may serve two functions: (1) the catalyst may have the right porosity to provide access to the active sites for the larger than normal HPNA from residue hydrocracking and (2) the high concentration of metals leads to saturation of the HPNA and lower boiling aromatics. Such a catalyst may also have high enough activity to open up the naphthenic rings, and thereby the embedded nitrogen, which can then be treated. The all metal catalyst may thus allow the subsequent hydrodenitrogenation and hydrocracking, which would otherwise be severely inhibited. Use of the all metal catalyst may permit the conversion of nitrogen at lower temperatures. Without such a catalyst and the associated activity, there would be no recourse but to try to convert the nitrogen through higher temperatures, which would lead to the formation of higher amounts of HPNA, such as by Scholl condensation. Further, without access to the active sites of the all metal catalyst, the larger HPNA would readily form carbonaceous deposits, fouling the catalyst. An exemplary all-metal catalyst may include ICR® 1000, available from Grace Catalyst Technologies.

Catalysts useful in Step 2 Stage 2 may include hydrocracking catalyst useful for converting heavy hydrocarbons (oil) from Stage 1 to a very hydrogenated naphtha and lighter products. The desired activity may be provided, for example, by noble metal zeolitic catalysts, among others. In some embodiments, a guard bed containing the all metal catalysts may also be used in Stage 2 to further protect the noble metal zeolitic catalysts or other catalysts used, if necessary.

Example

The following is an example for the conversion of Middle Eastern High Sulfur Fuel Oil (ME HSFO) according to embodiments herein. The ME HSFO feed includes 4.5 wt % sulfur, 3300 ppm nitrogen, 10.3 wt % hydrogen, 84.8 wt % carbon, 130 ppm nickel and vanadium, and 23 wt % Conradson Carbon.

The ME HSFO is contacted with a catalyst in Step 1 reactor (ebullated bed containing extrudate catalyst or a slurry reactor including a liquid circulation catalyst). Operating conditions in Step 1 may include an operating temperature in the range from about 390° C. to about 440° C., an operating pressure in the range from 170 bar to 195 bar, and a liquid hourly space velocity in the range from 0.1 to 0.5 h$^{-1}$.

The products after the first stage of conversion may be as shown in Table 1.

TABLE 1

| Component | Wt % |
| --- | --- |
| Ethane | 1.3-2 |
| LPG | 3.2-5 |
| Light Naphtha | 3.0-8.0 |
| Heavy Naphtha | 5.2-18.3 |
| Diesel | 37.0-42.0 |
| VGO | 23.0-40.0 |
| ULSFO or Pitch | 3.0-10.0 |

The product components from Step 1 listed above may have the following compositions, as shown in Table 2.

TABLE 2

| | | |
| --- | --- | --- |
| Light Naptha | Paraffins | 65-70 wt % |
| | Naphthenes | 20-25 wt % |
| | Aromatics | 4-6 wt % |
| | Nitrogen | 30-50 wppm |

TABLE 2-continued

| | | |
|---|---|---|
| | Sulfur | 300-400 wppm |
| Heavy Naphtha | Paraffins | 30-40 wt % |
| | Naphthenes | 40-45 wt % |
| | Aromatics | 15-18 wt % |
| | Nitrogen | 80-100 wppm |
| | Sulfur | 100-150 wppm |
| Diesel | Paraffins | 20-30 wt % |
| | Naphthenes | 20-30 wt % |
| | Aromatics | 40-50 wt % |
| | Nitrogen | 500-600 wppm |
| | Sulfur | 1600-1800 ppm |
| | 2+ ring aromatics | 7-9 wt % |
| VGO | Paraffins | 20-25 wt % |
| | Naphthenes | 20-30 wt % |
| | Aromatics | 45-55 wt % |
| | Sulfur | 2000-3500 wppm |
| | HPNA (4+ rings) | 10,000-25,000 wppm |

The light naphtha product cannot be fed to a steam cracker, based on its composition. Similarly, the heavy naphtha cannot be fed to a catalytic reformer or a steam cracker. The diesel would cause rapid fouling and poor ethylene yield if fed to a steam cracker. And the VGO cannot be fed to a steam cracker, as the HPNA will very rapidly convert to coke in the high temperatures in the Steam Cracker, and result in very poor ethylene yields and very high yield of pyrolysis fuel oil.

The products from Step 1 may then be upgraded in Step 2, which includes an integrated two-stage hydrocracker with recycle. Step 2 Stage 1 contains a catalyst system including a Type II hydrotreating catalyst, such as a Ni—Mo catalyst, followed by an unsupported tri-metallic catalyst system targeting deep hydrogenation and ring opening followed by HDN, followed by a layer of nitrogen tolerant hydrocracking catalyst. Operating conditions in Step 2 Stage 1 may include an operating temperature in the range from about 340° C. to about 430° C., an operating pressure in the range from 150 bar to 180 bar, and a liquid hourly space velocity in the range from 0.5 to 2.5 $h^{-1}$. Operating conditions in Step 2 Stage 2 may include an operating temperature in the range from about 300° C. to about 400° C., an operating pressure in the range from 150 bar to 180 bar, and a liquid hourly space velocity in the range from 0.5 to 3.0 $h^{-1}$.

Following the hydrocracking Stage 1, the reactor effluent is flashed to recover hydrogen for recycle and to remove ammonia and hydrogen sulfide. The effluent is then directed to an intermediate fractionator to recover products. The bottoms from the fractionator are directed to a clean second stage (Step 2 Stage 2), where another hydrocracking catalyst converts the unconverted oil from Stage 1 to very hydrogenated naphtha and lighter products. The final product mixture resulting from Stage 2 may be as follows in Table 3.

TABLE 3

| Fraction | Component | Amount |
|---|---|---|
| Light Naptha | Paraffins | 75-85 wt % |
| | Naphthenes | 15-20 wt % |
| | Aromatics | 2-5 wt % |
| | Sulfur + Nitrogen | <1 wppm |
| Heavy Naphtha | Paraffins | 40-45 wt % |
| | Naphthenes | 45-50 wt % |
| | Aromatics | 8-10 wt % |
| | Sulfur + Nitrogen | <0.5 wppm |

The whole naphtha yield suitable for petrochemicals production may thus be in the range from 85-92 wt %. The C2, C3, LPG and Light Naphtha are ideal components for the steam cracker. The heavy naphtha with very high nitrogen plus aromatics content is ideal for a catalytic reformer but can also be fed to the steam cracker.

By avoiding making either diesel or VGO, embodiments herein eliminate the risk of fouling in the Transfer Line Exchanger or pyrolysis furnace in the Steam Cracker. The specification of HPNA content to a steam cracker is very stringent. This is not a concept known to those with knowledge of refining units or ethylene units alone, but requires a thorough understanding of the molecular transformation in each unit.

As a result of the above processing, the whole naphtha, when sent to a steam cracker, may yield 23-30 wt % ethylene, 13-16 wt % propylene, 6-7 wt % butadiene, and less than 5 wt % aromatics and pyrolysis fuel oil. The pyrolysis fuel oil may be recycled to residue hydrocracking section. The unconverted pitch may be used as fuel or converted to hydrogen using a partial oxidation unit. The steam cracker may also supply hydrogen for the residue hydrocracking and integrated hydrocracking section.

As described above, the reactor configuration, operating conditions, and catalysts systems described herein may produce the correct feeds for petrochemicals production. The VGO derived from Residue Conversion is extremely high in heavy polynuclear aromatic content and nitrogen; if one were to send this VGO to a typical hydrotreating unit loaded with conventional Ni—Mo catalyst, the catalyst would deactivate very fast because of the formation of higher molecular weight HPNA (heavy polynuclear aromatics) from the feed HPNA molecules. Even if the VGO were to be converted, the product diesel and naphtha range distillates would be high in naphthenic rings that would not produce high olefin yields if fed to a steam cracker.

In contrast, embodiments herein integrate a high-pressure hydrocracker with the HSFO cracker in a single high-pressure loop utilizing a two-stage with recycle hydrocracker to: (i) minimize conversion of residue-derived vacuum gas oil in a non-favorable (high ammonia environment); (ii) maximize hydrodenitrogenation (HDN) in the first stage using a catalyst with very high hydrogenation activity; and (iii) maximize conversion in a second stage in a clean (ammonia and hydrogen sulfide free) environment to produce naphtha products with the correct molecular structure for either catalytic reforming or steam cracking.

As also described above, embodiments herein provide for the conversion of low cost feedstocks, such as high sulfur fuel oil, to higher value petrochemicals, including aromatics. Embodiments herein may also eliminate the need for a refinery and the need to make any transportation fuels from these low value hydrocarbons, may dramatically reduce investment costs with integration, and/or may provide an excellent outlet for pyrolysis fuel oil from a steam cracker.

Additionally, embodiments herein provide for unit integration, and in addition to process flows between units, there may be substantial heat integration. For example, heat integration may be provided between the hydrocrackers (fuel oil and distillate) and the ethylene (steam) cracker, in particular, and in some embodiments the catalytic reformer. As the entire hydrocracking process may be considered feed preparation for the steam cracker and the catalytic reformer, the net exothermic hydrocrackers can be integrated with the severely endothermic steam cracker and catalytic reformer. For example, there would be no need for product run downs from the hydrocrackers as the products would be directed directly to the cracking furnaces.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for converting high sulfur fuel oils to petrochemicals, the process comprising:
hydrocracking a high sulfur fuel oil in an ebullated bed or slurry bed fuel oil hydrocracker to form a cracked fuel oil effluent;
separating the cracked fuel oil effluent into a light fraction and a heavy fraction;
hydrocracking the light fraction in a distillate hydrocracker to form a cracked effluent;
separating the cracked effluent into a hydrogen fraction, a lights fraction comprising C2, C3, and/or C4 hydrocarbons, a light naphtha fraction, and a heavy naphtha fraction;
reforming the heavy naphtha fraction to produce a reformer effluent comprising hydrogen and at least one of benzene, toluene, and xylenes;
steam cracking the lights fraction and/or the light naphtha fraction to produce a steam cracker effluent comprising at least one of ethylene, propylene, benzene, toluene, and xylenes.

2. The process of claim 1, further comprising:
gasifying the heavy fraction to produce a syngas comprising carbon monoxide and hydrogen; and
feeding the syngas to the fuel oil hydrocracker; or
separating hydrogen from the syngas and feeding hydrogen recovered from the syngas to the fuel oil hydrocracker.

3. The process of claim 1, further comprising separating the steam cracker effluent into a hydrogen fraction, one or more light olefin fractions comprising propylene and/or ethylene, one or more aromatic fractions, and a pyrolysis gas oil fraction.

4. The process of claim 3, further comprising feeding the steam cracker effluent hydrogen fraction to the distillate hydrocracker.

5. The process of claim 3, further comprising feeding the pyrolysis gas oil fraction to the fuel oil hydrocracker.

6. The process of claim 1, further comprising separating the reformer effluent to form a hydrogen fraction and one or more aromatics fractions.

7. The process of claim 6, further comprising feeding the reformer effluent hydrogen fraction to the distillate hydrocracker.

8. A system for converting high sulfur fuel oils to petrochemicals, the system comprising:
an ebullated bed or slurry bed fuel oil hydrocracker for hydrocracking a high sulfur fuel oil to form a cracked fuel oil effluent;
a first separator for separating the cracked fuel effluent into a light fraction and a heavy fraction;
a distillate hydrocracker for hydrocracking the light fraction to form a cracked effluent;
a second separation system comprising a flash drum and fractionator for separating the cracked effluent into a hydrogen fraction, a light hydrocarbon fraction, a light naphtha fraction, and a heavy naphtha fraction;
a catalytic reformer for reforming the heavy naphtha fraction to produce a reformer effluent comprising hydrogen and at least one of benzene, toluene, and xylenes;
a steam cracker for steam cracking the light hydrocarbon fraction and/or the light naphtha fraction to produce a steam cracker effluent comprising at least one of ethylene, propylene, benzene, toluene, and xylenes.

9. The system of claim 8, further comprising:
a gasifier for gasifying the heavy fraction to produce a syngas comprising carbon monoxide and hydrogen; and
a flow line for feeding the syngas to the fuel oil hydrocracker; or
a separator for separating hydrogen from the syngas and a flow line for feeding hydrogen separated from the syngas to the fuel oil hydrocracker.

10. The system of claim 8, further comprising a third separation system comprising one or more distillation columns for separating the steam cracker effluent into a hydrogen fraction, one or more light olefin fractions comprising propylene and/or ethylene, one or more aromatic fractions, and a pyrolysis gas oil fraction.

11. The system of claim 10, further comprising a flow line for feeding the steam cracker effluent hydrogen fraction to the distillate hydrocracker.

12. The system of claim 10, further comprising a flow line for feeding the pyrolysis gas oil fraction to the fuel oil hydrocracker or the distillate hydrocracker or both.

13. The system of claim 8, further comprising a fourth separation system comprising one or more distillation columns for separating the reformer effluent to form a hydrogen fraction and one or more aromatics fractions.

14. The system of claim 13, further comprising a flow line for feeding the reformer effluent hydrogen fraction to the distillate hydrocracker.

15. The system of claim 8, further comprising a separator for separating the pyrolysis gas oil fraction into a light pyrolysis gas oil fraction and a heavy pyrolysis gas oil fraction.

16. The system of claim 15, further comprising a flow line for feeding the heavy pyrolysis gas oil fraction to the fuel oil hydrocracker and a flow line for feeding the light pyrolysis gas oil fraction to the distillate hydrocracker.

17. A process for converting high sulfur fuel oils to petrochemicals, the process comprising:
hydrocracking a high sulfur fuel oil in an ebullated bed or slurry bed fuel oil hydrocracker to form a cracked fuel oil effluent;
separating the cracked fuel oil effluent into a light fraction and a heavy fraction;
hydrocracking the light fraction in a distillate hydrocracker to form a cracked effluent;
separating the cracked effluent to recover one or more gas fractions comprising hydrogen, hydrogen sulfide, and/or ammonia, and to recover two or more hydrocarbon fractions, including a light hydrocarbon fraction and a heavy hydrocarbon fraction;
hydrocracking the heavy hydrocarbon fraction to produce a hydrocracked effluent comprising naphtha range and lighter hydrocarbons;
feeding the light hydrocarbon fraction and the hydrocracked effluent to an ethylene complex to produce petrochemicals including ethylene, propylene, butadiene, benzene, toluene, xylenes, and/or methyl tertiary-butyl ether.

18. The process of claim 17, further comprising:
gasifying the heavy fraction to produce a syngas comprising carbon monoxide and hydrogen; and
feeding the syngas to the fuel oil hydrocracker; or
separating hydrogen from the syngas and feeding hydrogen separated from the syngas to the fuel oil hydrocracker.

19. The process of claim 17, further comprising feeding the heavy fraction to a delayed coking unit or a cement plant.

20. The process of claim 17, wherein the heavy fraction is an IMO compliant ultralow sulfur fuel oil comprising less than 0.5 wt% sulfur.

21. The process of claim 17, wherein the hydrocracking the light fraction in a distillate hydrocracker to form a cracked effluent comprises:
reacting the light fraction in a first reaction zone containing hydrotreating catalyst;
reacting the first reaction zone effluent in a second reaction zone containing an unsupported tri-metallic catalyst; and
reacting the second reaction zone effluent in a third reaction zone containing a nitrogen-tolerant hydrocracking catalyst.

22. The process of claim 21, wherein each of the first, second, and third reaction zones are operated at a temperature in the range from about 340° C. to about 430° C., a pressure in the range from about 150 bara to about 180 bara, and a liquid hourly space velocity in the range from about 0.5 $h^{-1}$ to about 2.5 $h^{-1}$.

23. The process of claim 17, wherein the hydrocracking the heavy hydrocarbon fraction to produce a hydrocracked effluent comprising naphtha range and lighter hydrocarbons comprises:
reacting the heavy hydrocarbon fraction in a reaction zone containing an unsupported tri-metallic catalyst; and
reacting the reaction zone effluent in a downstream reaction zone containing a noble metal zeolitic catalyst.

24. The process of claim 23, wherein each of the reaction zone and the downstream reaction zone are operated at a temperature in the range from about 300° C. to about 400° C., a pressure in the range from about 150 bara to about 180 bara, and a liquid hourly space velocity in the range from about 0.5 $h^{-1}$ to about 3.0 $h^{-1}$.

25. The process of claim 17, wherein the hydrocracking a high sulfur fuel oil in a fuel oil hydrocracker comprises reacting the high sulfur fuel oil in a reaction zone operated at a temperature in the range from about 390° C. to about 440° C., a pressure in the range from about 170 bara to about 195 bara, and a liquid hourly space velocity in the range from about 0.1 $h^{-1}$ to about 0.5 $h^{-1}$.

26. A system for converting high sulfur fuel oils to petrochemicals, the system comprising:
an ebullated bed or slurry bed fuel oil hydrocracker for hydrocracking a high sulfur fuel oil in to form a cracked fuel oil effluent;
a separator for separating the cracked fuel oil effluent into a light fraction and a heavy fraction;
a distillate hydrocracker for hydrocracking the light fraction in to form a cracked effluent;
a separation system comprising a flash drum and fractionator for separating the cracked effluent to recover one or more gas fractions comprising hydrogen, hydrogen sulfide, and/or ammonia, and to recover two or more hydrocarbon fractions, including a light hydrocarbon fraction and a heavy hydrocarbon fraction;
a hydrocracker for hydrocracking the heavy hydrocarbon fraction to produce a hydrocracked effluent comprising naphtha range and lighter hydrocarbons;
an ethylene complex for converting the light hydrocarbon fraction and the hydrocracked effluent to produce petrochemicals including ethylene, propylene, butadiene, benzene, toluene, xylenes, and/or methyl tertiary-butyl ether.

27. The system of claim 26, further comprising:
a gasifier for gasifying the heavy fraction to produce a syngas comprising carbon monoxide and hydrogen; and
a flow line for feeding the syngas to the fuel oil hydrocracker; or
a separator for separating hydrogen from the syngas and a flow line for feeding hydrogen separated from the syngas to the fuel oil hydrocracker.

28. The system of claim 26, wherein the ethylene complex comprises one or more of a steam cracker, a catalytic cracker, a metathesis unit, an etherification unit, a butadiene extraction unit, an aromatics extraction unit, and/or a disproportionation unit.

29. The system of claim 26, wherein the distillate hydrocracker comprises:
a first reaction zone containing hydrotreating catalyst;
a second reaction zone containing an unsupported tri-metallic catalyst; and
a third reaction zone containing a nitrogen-tolerant hydrocracking catalyst.

30. The system of claim 26, wherein the hydrocracker for hydrocracking the heavy hydrocarbon fraction to produce a hydrocracked effluent comprises:
a reaction zone containing an unsupported tri-metallic catalyst; and
a downstream reaction zone containing a noble metal zeolitic catalyst.

* * * * *